(12) United States Patent
Seo et al.

(10) Patent No.: US 9,534,154 B2
(45) Date of Patent: Jan. 3, 2017

(54) SEMICONDUCTOR DEVICE USING COMPOSITION FOR ANISOTROPIC CONDUCTIVE ADHESIVE FILM OR ANISOTROPIC CONDUCTIVE ADHESIVE FILM

(71) Applicants: Jin Young Seo, Uiwang-si (KR); Hyun Wook Kim, Uiwang-si (KR); Hyun Hee Namkung, Uiwang-si (KR); Kyung Il Sul, Uiwang-si (KR); Dong Seon Uh, Uiwang-si (KR); Kwang Jin Jung, Uiwang-si (KR); Jae Sun Han, Uiwang-si (KR)

(72) Inventors: Jin Young Seo, Uiwang-si (KR); Hyun Wook Kim, Uiwang-si (KR); Hyun Hee Namkung, Uiwang-si (KR); Kyung Il Sul, Uiwang-si (KR); Dong Seon Uh, Uiwang-si (KR); Kwang Jin Jung, Uiwang-si (KR); Jae Sun Han, Uiwang-si (KR)

(73) Assignee: Cheil Industries, Inc., Gumi-Si, Gyeongsangbuk-do (KR)

( * ) Notice: Subject to any disclaimer, the term of this patent is extended or adjusted under 35 U.S.C. 154(b) by 610 days.

(21) Appl. No.: 13/724,219

(22) Filed: Dec. 21, 2012

(65) Prior Publication Data

US 2013/0161566 A1 Jun. 27, 2013

(30) Foreign Application Priority Data

Dec. 26, 2011 (KR) ........................ 10-2011-0142092

(51) Int. Cl.
*H01B 1/20* (2006.01)
*C09J 9/00* (2006.01)
(Continued)

(52) U.S. Cl.
CPC ............. *C09J 9/02* (2013.01); *C09J 123/0853* (2013.01); *H01B 1/20* (2013.01)

(58) Field of Classification Search
CPC ................. H01B 1/00; H01B 1/20; C09J 9/02
See application file for complete search history.

(56) References Cited

U.S. PATENT DOCUMENTS

2009/0152505 A1* 6/2009 Jeon et al. ..................... 252/500
2010/0159234 A1* 6/2010 Bae et al. ...................... 428/327
(Continued)

OTHER PUBLICATIONS

"Dicyclopentenyl acrylate" http://www.chemicalbook.com/ProductChemicalPropertiesCB1707584_EN.htm 2008.*
(Continued)

*Primary Examiner* — Mark Kopec
(74) *Attorney, Agent, or Firm* — Lee & Morse, P.C.

(57) ABSTRACT

An electronic device includes an anisotropic conductive adhesive film as a connection material, wherein the anisotropic conductive adhesive film has a flowability of 50% or more after preliminary pressing at 80° C. and 1 MPa for 1 second and final pressing at 180° C. and 3 MPa for 5 seconds, and a connection resistance increment greater than 0% but not greater than 25%, as calculated by Expression 1:

Connection resistance increment (%)=|(A−B)/A|×100 (Expression 1)

where A is a connection resistance measured after preliminary pressing at 80° C. and 1 MPa for 1 second and final pressing at 180° C. and 3 MPa for 5 seconds, and B is a connection resistance measured after reliability evaluation at a temperature of 85° C. and a humidity of 85% for 250 hours following preliminary pressing and final pressing.

16 Claims, 1 Drawing Sheet

(51) Int. Cl.
   *C09J 9/02*      (2006.01)
   *C09J 123/08*    (2006.01)

(56) References Cited

U.S. PATENT DOCUMENTS

2011/0281119 A1* 11/2011 Akutsu et al. ............. 428/423.1
2013/0140083 A1*  6/2013 Izawa et al. ................ 174/94 R

OTHER PUBLICATIONS

"Dicyclopentadiene acrylate" http://www.guidechem.com/reference/dic-296898.html 2010.*

* cited by examiner

SEMICONDUCTOR DEVICE USING COMPOSITION FOR ANISOTROPIC CONDUCTIVE ADHESIVE FILM OR ANISOTROPIC CONDUCTIVE ADHESIVE FILM

CROSS-REFERENCE TO RELATED APPLICATION

The present application claims priority under 35 U.S.C. §119 to Korean Patent Application No. 10-2011-0142092, filed on Dec. 26, 2011, in the Korean Intellectual Property Office, and entitled: "SEMICONDUCTOR DEVICE USING COMPOSITION FOR ANISOTROPIC CONDUCTIVE ADHESIVE FILM OR ANISOTROPIC CONDUCTIVE ADHESIVE FILM," which is incorporated by reference herein in its entirety.

BACKGROUND

1. Field

Embodiments relate to an electronic device that includes a conductive adhesive film as a connection material.

2. Description of the Related Art

With the recent trend toward large size and slimness in display devices, pitches between electrodes and between circuits have become finer. Anisotropic conductive adhesive films may play an important role as interconnection mechanisms for the connection of fine circuit terminals. As a consequence, anisotropic conductive adhesive films are receiving much attention as materials for electrical connection.

SUMMARY

Embodiments are directed to an electronic device including an anisotropic conductive adhesive film as a connection material, wherein the anisotropic conductive adhesive film has a flowability of 50% or more after preliminary pressing at 80° C. and 1 MPa for 1 second and final pressing at 180° C. and 3 MPa for 5 seconds, and a connection resistance increment greater than 0% but not greater than 25%, as calculated by Expression 1:

$$\text{Connection resistance increment (\%)} = |(A-B)/A| \times 100 \quad \text{(Expression 1)}$$

where A is a connection resistance measured after preliminary pressing at 80° C. and 1 MPa for 1 second and final pressing at 180° C. and 3 MPa for 5 seconds, and B is a connection resistance measured after reliability evaluation at a temperature of 85° C. and a humidity of 85% for 250 hours following preliminary pressing and final pressing.

The anisotropic conductive adhesive film may be formed from a composition that includes an ethylene-vinyl acetate copolymer, at least one resin selected from the group of an acrylate modified urethane resin and an ester type urethane resin, an isocyanurate acrylate, and a dicyclopentadiene (meth)acrylate.

The solid weight ratio of the ethylene-vinyl acetate copolymer to a total amount of the at least one resin selected from the group of the acrylate modified urethane resin and the ester type urethane resin may be from about 1:3 to about 3:1.

The isocyanurate acrylate may include an isocyanuric acid ethylene oxide-modified triacrylate. The dicyclopentadiene (meth)acrylate may include a tricyclodecanedimethanol diacrylate.

Embodiments are also directed to electronic device including an anisotropic conductive adhesive film as a connection material, wherein the anisotropic conductive adhesive film may be formed from a composition that includes an ethylene-vinyl acetate copolymer, at least one resin selected from the group of an acrylate modified urethane resin and an ester type urethane resin, an isocyanurate acrylate, and a dicyclopentadiene (meth)acrylate.

The composition may further include a film-forming resin.

The anisotropic conductive adhesive composition may include about 10 to about 40% by weight of the ethylene-vinyl acetate copolymer, about 5 to about 40% by weight of a total amount of the at least one resin selected from the group of the acrylate modified urethane resin and the ester type urethane resin, about 5 to about 30% by weight of the isocyanurate acrylate, about 5 to about 30% by weight of the dicyclopentadiene (meth)acrylate, and about 5 to about 40% by weight of the film-forming resin, based on the total solid weight of the anisotropic conductive adhesive composition.

The anisotropic conductive adhesive composition may further include about 1 to about 10% by weight of an organic peroxide and about 1 to about 10% by weight of conductive particles.

A solid weight ratio of the ethylene-vinyl acetate copolymer to a total amount of the at least one resin selected from the group of the acrylate modified urethane resin and the ester type urethane resin may be from about 1:3 to about 3:1.

The at least one resin selected from the group of an acrylate modified urethane resin and an ester type urethane resin may include the acrylate modified urethane resin. The acrylate modified urethane resin is formed from a diisocyanate, a polyol, and an acrylate.

The diisocyanate that forms the acrylate modified urethane resin may be selected from the group of tetramethylene-1,4-diisocyanate, hexamethylene-1,6-diisocyanate, cyclohexylene-1,4-diisocyanate, methylenebis(4-cyclohexyl diisocyanate), isophorone diisocyanate, 4,4'-methylenebis(cyclohexyl diisocyanate), and mixtures thereof.

The polyol that forms the acrylate modified urethane resin may be a polyester polyol, a polycarbonate polyol, or a diol, the diol being selected from the group of 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, and 1,4-cyclohexanedimethanol.

The acrylate that forms the acrylate modified urethane resin may be a hydroxyacrylate or an amine acrylate.

The at least one resin selected from the group of an acrylate modified urethane resin and an ester type urethane resin may include the acrylate modified urethane resin. The acrylate modified urethane resin is a reaction product of a polyester polyol and a diisocyanate.

The polyester polyol that forms the acrylate modified urethane resin may be a reaction product of a dicarboxylic acid and a diol. The dicarboxylic acid may be at least one of phthalic acid, terephthalic acid, isophthalic acid, adipic acid, sebacic acid, succinic acid, glutaric acid, suberic acid, azelaic acid, sebasic acid, dodecanedicarboxylic acid, hexahydrophthalic acid, ortho-phthalic acid, tetrachlorophthalic acid, 1,5-naphthalenedicarboxylic acid, fumaric acid, maleic acid, itaconic acid, citraconic acid, methaconic acid or tetrahydrophthalic acid. The diol may be at least one of ethylene glycol, propylene glycol, hexanediol, neopentyl glycol, diethylene glycol, triethylene glycol, 1,3-propanediol, 1,3-butanediol, 1,4-butanediol, 1,5-pentanediol, 1,6-hexanediol, dipropylene glycol, dibutylene glycol, 2-methyl-1,3-pentanediol, 2,2,4-trimethyl-1,3-pentanediol or 1,4-cyclohexanedimethanol.

The diisocyanate that forms the acrylate modified urethane resin may be selected from the group of isophorone diisocyanate (IPDI), tetramethylene-1,4-diisocyanate, hexamethylene-1,6-diisocyanate, diphenylmethane diisocyanate, cyclohexylene-1,4-diisocyanate, methylenebis(4-cyclohexyl isocyanate), xylene diisocyanate, hydrogenated diphenylmethane diisocyanate, naphthalene diisocyanate, 2,4-toluene diisocyanate, 2,6-toluene diisocyanate, and mixtures thereof.

The film-forming resin may be selected from the group of olefin resins, including polyethylene and polypropylene, butadiene resins, acrylonitrile-butadiene copolymers, carboxyl-terminated acrylonitrile-butadiene copolymers, polyimide resins, polyamide resins, polyester resins, polyvinyl butyral resins, styrene-butylene-styrene (SBS) resins, styrene-ethylene-butylene-styrene (SEBS) resins, acrylonitrile-butadiene rubbers (NBRs), styrene acrylonitrile resins, urethane resins, (meth)acrylic resins and phenoxy resins.

Embodiments are also directed to an electronic device including an anisotropic conductive adhesive composition as a connection material, wherein the anisotropic conductive adhesive composition includes an isocyanurate acrylate and a dicyclopentadiene (meth)acrylate and has a flowability of 50% or more after preliminary pressing at 80° C. and 1 MPa for 1 second and final pressing at 180° C. and 3 MPa for 5 seconds.

BRIEF DESCRIPTION OF DRAWINGS

Features will become apparent to those of skill in the art by describing in detail exemplary embodiments with reference to the attached drawings in which.

DETAILED DESCRIPTION

Figure 1:
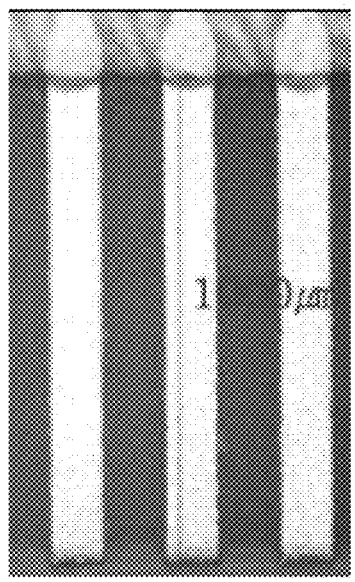
FIG. 1 illustrates a micrograph showing a criterion for measuring the lengths of electrodes of FPCB terminals used when the flowability of an anisotropic conductive adhesive film according to an aspect is evaluated.

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In one aspect, an electronic device includes an anisotropic conductive adhesive composition as a connection material. The anisotropic conductive adhesive composition may include an ethylene-vinyl acetate copolymer, an isocyanurate acrylate, and a dicyclopentadiene (meth)acrylate. The ethylene-vinyl acetate copolymer may be a highly flowable material, may have a weight average molecular weight of about 100,000 to about 600,000, which is a preferred range complying with thermal pressing conditions of an anisotropic conductive film. The ethylene-vinyl acetate copolymer may be included in an amount of about 10 to about 40% by weight, preferably about 15 to about 30% by weight, based on the total solid weight of the anisotropic conductive adhesive composition. If the content of the ethylene-vinyl acetate copolymer is less than about 10% by weight, satisfactory improvement in flowability may not be exhibited. If the content of the ethylene-vinyl acetate copolymer exceeds about 40% by weight, an unfavorable decrease in the densification of a cured structure may be exhibited.

In this aspect, the isocyanurate acrylate and the dicyclopentadiene (meth)acrylate are used as components of a reactive curable system. The isocyanurate acrylate begins to cure at a low reaction temperature and has a high reaction rate. Due to these advantages, the isocyanurate acrylate accelerates curing of the anisotropic conductive resin composition. As the isocyanurate acrylate, there may be used, for example, isocyanuric acid ethylene oxide-modified triacrylate or tris(2-hydroxyethyl)isocyanurate triacrylate. The use of isocyanuric acid ethylene oxide-modified triacrylate is particularly preferred.

The isocyanurate acrylate preferably has a differential scanning calorimetry (DSC) exothermic peak at 85 to 95° C. Particularly, a DSC exothermic peak at 92 to 95° C. is more preferred because such a range may indicate sufficient curing of an anisotropic conductive film by final pressing for a short time. An exothermic peak of the isocyanurate acrylate that appears below 85° C. may indicate that the anisotropic conductive film composition is pre-cured, and as a result, the anisotropic conductive film may not be sufficiently pressable against electrodes. An exothermic peak of the isocyanurate acrylate that appears above 95° C. may indicate that the anisotropic conductive film composition is not curable within a short time, and reliability of connection resistance may not be obtained.

The isocyanurate acrylate may be included in an amount of about 5 to about 30% by weight, preferably about 10 to about 25% by weight, based on the total solid weight of the anisotropic conductive adhesive composition. The presence of the isocyanurate acrylate in an amount of less than about 5% by weight may lead to poor connection reliability. The presence of the isocyanurate acrylate in an amount exceeding about 30% by weight may lead to a reduction in adhesive strength.

The dicyclopentadiene (meth)acrylate may serve to improve the modulus of a cured product, resulting in high reliability. As the dicyclopentadiene (meth)acrylate, there may be used, for example, tricyclodecanedimethanol diacrylate or tricyclodecanedimethanol dimethacrylate. The use of tricyclodecanedimethanol diacrylate is particularly preferred. The dicyclopentadiene (meth)acrylate may be included in an amount of about 5 to about 30% by weight, preferably about 7 to about 25% by weight, based on the total solid weight of the anisotropic conductive adhesive composition. The presence of the dicyclopentadiene (meth)acrylate in an amount of less than about 5% by weight may lead to poor connection reliability. On the other hand, the presence of the dicyclopentadiene (meth)acrylate in an amount exceeding about 30% by weight may lead to a reduction in adhesive strength.

The simultaneous presence of the ethylene-vinyl acetate copolymer, the isocyanurate acrylate and the dicyclopentadiene (meth)acrylate may result in improved flowability of the anisotropic conductive adhesive composition even under final pressing conditions within a short time while maintaining low connection resistance even after reliability evaluation under high temperature and high humidity conditions, thereby ensuing high reliability even after long-term use.

In this aspect, the solid weight ratio of the ethylene-vinyl acetate copolymer to the isocyanurate acrylate or the solid weight ratio of the ethylene-vinyl acetate copolymer to the dicyclopentadiene (meth)acrylate may be from about 3:1 to about 1:2, preferably from about 3:1 to about 1:1.

In another implementation, an electronic device may include an anisotropic conductive adhesive composition as an connection material wherein the anisotropic conductive adhesive composition includes an ethylene-vinyl acetate copolymer, an isocyanurate acrylate, a dicyclopentadiene (meth)acrylate, and at least one resin selected from the group of an acrylate modified urethane resin and an ester type urethane resin.

The acrylate modified urethane resin may have a glass transition temperature of about 100° C. or less, which may improve the flowability of the composition. In addition, high adhesive strength may be exhibited due to the presence of urethane groups in the molecular chain of the acrylate modified urethane resin. Particularly, the use of the acrylate modified urethane resin may improve the curability of an anisotropic conductive film, enabling connection of the film at a low processing temperature. Constituent components of the acrylate modified urethane resin may include, for example, a diisocyanate, a polyol, a diol and an acrylate. The acrylate modified urethane resin may have a weight average molecular weight of 1,000 to about 50,000 g/mol and may have one or more terminal acrylate groups. The weight average molecular weight of the acrylate modified urethane resin may be from about 20,000 to about 100,000 g/mol, preferably from about 20,000 to about 40,000 g/mol.

The ester type urethane resin may have a combination of an organic compound having a urethane group and an organic compound having an ester group. That is, the ester type urethane compound preferably has both a urethane group and an ester group in the main chain thereof. The ester type urethane compound may be obtained, for example, by reaction of a polyester polyol and a diisocyanate. (An ester type urethane compound obtained by this reaction may also be called a polyester urethane resin.) The glass transition temperature of the ester type urethane compound is preferably 100° C. or above. The glass transition temperature of the ester type urethane compound may be adjusted to 100° C. or above by varying the kind, molecular weight, etc., of the polyester polyol or the diisocyanate. The ester type urethane compound is preferably a negatively charged ion, which may contribute to further improvement of adhesive strength. The negatively charged ionic ester type urethane compound may be obtained by copolymerization with a diol or diamine having a sulfonic acid or carboxyl group in the side chain thereof during reaction of the polyester polyol and the diisocyanate. That is, the ester type urethane compound preferably has a sulfonic acid or carboxyl group.

The ester type urethane compound may have an aromatic group, for example, an aromatic group including a benzene ring, or an alicyclic group, for example, an alicyclic group including a cyclohexane ring.

A mixture of two or more different kinds of ester type urethane compounds may be used. For example, the ester type urethane compound may be a combination of a urethane compound obtained by reacting an aromatic polyester polyol with an aliphatic diisocyanate and a urethane compound obtained by reacting an aliphatic polyester polyol with an aromatic diisocyanate.

The weight average molecular weight of the ester type urethane compound is preferably from about 5,000 to about 100,000. If the weight average molecular weight is lower than about 5,000, the film-forming properties of the ester type urethane compound when molding into a film may deteriorate. On the other hand, if the weight average molecular weight is higher than about 100,000, the solubility of the ester type urethane compound in a solvent or the compatibility of the ester type urethane compound with a solvent may deteriorate, tending to make it difficult to produce a coating solution for film molding.

The solid weight ratio of the ethylene-vinyl acetate copolymer to either the acrylate modified urethane resin or the ester type urethane resin, or both, if both are present, may be from about 1:3 to about 3:1, preferably from about 1:2 to about 2:1.

The acrylate modified urethane resin and/or the ester type urethane resin may be included in an amount of about 5 to about 40% by weight, based on the total solid weight of the anisotropic conductive adhesive composition.

In another implementation, an electronic device includes an anisotropic conductive adhesive composition as a connection material wherein the anisotropic conductive adhesive composition includes an ethylene-vinyl acetate copolymer, an isocyanurate acrylate, a dicyclopentadiene (meth)acrylate, at least one resin selected from the group of an acrylate modified urethane resin and an ester type urethane resin, and a film-forming resin.

The film-forming resin may be a polymer resin acting as a matrix of an anisotropic conductive adhesive film and may be a thermoplastic resin, a thermosetting resin or a combination thereof. The polymer resin is may be selected from, for example, the group of olefin resins, including polyethylene and polypropylene, butadiene resins, acrylonitrile-butadiene copolymers, carboxyl-terminated acrylonitrile-butadiene copolymers, polyimide resins, polyamide resins, polyester resins, polyvinyl butyral resins, styrene-butylene-styrene (SBS) resins, styrene-ethylene-butylene-styrene (SEBS) resins, acrylonitrile-butadiene rubbers (NBRs), urethane resins, (meth)acrylic resins and phenoxy resins.

Of these, a polymer resin having a molecular weight of about 10,000 to about 1,000,000 is preferred in terms of film-forming properties.

The film-forming resin may function to balance the excessive flowability of the ethylene-vinyl acetate copolymer and the acrylate modified urethane resin or the ester type urethane resin to maintain the shape of a film.

The film-forming resin may be included in an amount of about 5 to about 40% by weight, based on the total solid weight of the anisotropic conductive adhesive composition.

The anisotropic conductive adhesive composition may further include components commonly used in the art, for example, a material having a (meth)acrylate group, an organic peroxide and conductive particles.

In another implementation, an electronic device may include an anisotropic conductive adhesive composition as a connection material wherein the anisotropic conductive adhesive composition includes: about 10 to about 40% by weight of an ethylene-vinyl acetate copolymer, about 5 to about 40% by weight of at least one resin selected from the group of an acrylate modified urethane resin and an ester type urethane resin, about 5 to about 30% by weight of an isocyanurate acrylate, and about 5 to about 30% by weight of a dicyclopentadiene (meth)acrylate, based on the total solid weight thereof.

In this implementation, the anisotropic conductive adhesive composition may further include about 1 to about 10% by weight of an organic peroxide and about 1 to about 10% by weight of conductive particles.

In another implementation, an electronic device may include an anisotropic conductive adhesive film as a connection material wherein the anisotropic conductive adhesive film has a flowability of 50% or more after preliminary pressing at 80° C. and 1 MPa for 1 second and final pressing at 180° C. and 3 MPa for 5 seconds, and a connection resistance increment greater than 0% but not greater than 25%, as calculated by Expression 1:

Connection resistance increment (%)=|(A−B)/A|×100 (Expression 1)

where A is a connection resistance measured after preliminary pressing at 80° C. and 1 MPa for 1 second and final pressing at 180° C. and 3 MPa for 5 seconds, and B is a connection resistance measured after reliability evaluation at a temperature of 85° C. and a humidity of 85% for 250 hours following preliminary pressing and final pressing.

The anisotropic conductive adhesive film used herein may be characterized by having a flowability of 50% or more after preliminary pressing and final pressing. At a flowability of less than 50%, the pressing may be insufficient, causing a problem of low connection reliability. The flowability of the anisotropic conductive adhesive film is preferably in the range of 50% to 80%, particularly preferably 50% to 70%. Within this range, thermal pressing of the anisotropic conductive adhesive film may facilitate movement of polymer resins around conductive particles, making it easier to obtain electrical connection. In addition, mechanical stress remaining in the cured film may be diminished, resulting in increased electrical and mechanical stability of portions to which the anisotropic conductive adhesive film is connected even under extreme conditions for a long time.

The flowability (%) may be calculated by measuring the width ($A_0$) of the anisotropic conductive film before preliminary pressing and final pressing, preliminarily pressing the anisotropic conductive film against circuit forming portions of a glass panel at 80° C. and 1 MPa for 1 second, removing a release film, locating FPCB terminals (pitch=140 μm, electrode height=25 μm, electrode length=1,000 μm (the electrode length refers to the vertical length of the electrode, see FIG. 1)) opposite the circuit forming portions, final pressing the anisotropic conductive film at 180° C. and 3 MPa for 5 seconds, measuring the width ($A_t$) of the central portion of the anisotropic conductive film, and substituting the measured widths $A_0$ and $A_t$ into Equation 1:

Flowability (%)=$A_t/A_0$×100 (Equation 1)

The anisotropic conductive adhesive film may have a connection resistance increment greater than 0% but not greater than 25%, as calculated by Expression 1:

Connection resistance increment (%)=|(A−B)/A|×100 (Expression 1)

where A is a connection resistance measured after preliminary pressing at 80° C. and 1 MPa for 1 second and final pressing at 180° C. and 3 MPa for 5 seconds, and B is a connection resistance measured after reliability evaluation at a temperature of 85° C. and a humidity of 85% for 250 hours following preliminary pressing and final pressing.

In the anisotropic conductive adhesive film used herein, A may be 2Ω or less and B may be 2.5Ω or less. The connection resistance may be measured by suitable methods known in the art, for example, a 2-point probe method. According to the 2-point probe method, the resistance between two points of the anisotropic conductive adhesive film is measured using two probes connected to an ohmmeter. The resistance may be calculated from a voltage measured when the ohmmeter applies a current of 1 mA.

By use of an isocyanurate acrylate and a dicyclopentadiene (meth)acrylate as reactive curable materials, the modulus of the cured product may be improved, resulting in high connection reliability.

In yet another implementation, an electronic device may include an anisotropic conductive adhesive film as a connection material wherein the anisotropic conductive adhesive film has a bubbling area of less than 5% after the preliminary pressing and final pressing.

The bubbling area (%) may be measured by suitable methods known in the art. The bubbling area may be calculated by preparing five specimens connected to electrodes under the preliminary pressing and final pressing conditions, taking images of 10 sites of each specimen using an optical microscope, measuring the bubbling areas of space portions between the electrodes using an image analyzer, and averaging the measured values.

The anisotropic conductive adhesive film and composition may be used for film-on-glass (FOG).

Hereinafter, a detailed explanation will be given concerning the individual components of the anisotropic conductive adhesive composition.

<Anisotropic Conductive Adhesive Composition>

Ethylene-Vinyl Acetate Copolymer

The ethylene-vinyl acetate copolymer may be a highly flowable material and may have a weight average molecular weight of about 100,000 to about 600,000, which is a preferred range complying with heating and pressing conditions of the anisotropic conductive film. The ethylene-vinyl acetate copolymer may be included in an amount of about 10 to about 40% by weight, preferably 15 to 30% by weight, based on the total solid weight of the anisotropic conductive adhesive composition.

If the content of the ethylene-vinyl acetate copolymer is less than about 10% by weight, satisfactory improvement in flowability may not exhibited. If the content of the ethylene-vinyl acetate copolymer exceeds about 40% by weight, an unfavorable decrease in the densification of a cured structure may be exhibited.

The ethylene-vinyl acetate copolymer preferably includes vinyl acetate units in an amount of about 20 to about 80% by weight, more preferably about 40 to about 70% by weight, based on the total weight thereof.

20% by weight of the vinyl acetate units corresponds to 24.5 mole % on the basis of molar ratio. Accordingly, monomer units substantially constituting the main chain of the ethylene-vinyl acetate copolymer may come from the ethylene. As the content of the vinyl acetate units increases, better solubility may be exhibited and higher tackiness within the adhesive components may be exhibited. The ethylene-vinyl acetate copolymer may have a melt index (MI) of about 2 to about 500. Accordingly, the use of the ethylene-vinyl acetate copolymer as an anisotropic conductive adhesive component may require mixing with other components for better physical properties, such as processability.

If the content of the vinyl acetate units is less than about 20% by weight, sufficient flow may not occur upon curing by crosslinking at low temperature. If the content of the vinyl acetate units exceeds about 80% by weight, the softening temperature of the adhesive composition may be lowered, causing problems in storability and practical use.

Reactive Curable System

The isocyanurate acrylate and the dicyclopentadiene (meth)acrylate may be used as components of a reactive curable system.

Isocyanurate Acrylate

The isocyanurate acrylate may begin to cure at a low reaction temperature and may have a high reaction rate. Due to these advantages, the isocyanurate acrylate may accelerate curing of the anisotropic conductive resin composition. As the isocyanurate acrylate, there may be used, for example, isocyanuric acid ethylene oxide-modified triacrylate or tris(2-hydroxyethyl)isocyanurate triacrylate. The use of isocyanuric acid ethylene oxide-modified triacrylate is particularly preferred. The isocyanuric acid ethylene oxide-modified triacrylate may begin to cure at a low reaction temperature and has a high reaction rate. Due to these advantages, the isocyanuric acid ethylene oxide-modified triacrylate may accelerate curing of the anisotropic conductive resin composition. Therefore, the isocyanuric acid ethylene oxide-modified triacrylate may function to allow the anisotropic conductive resin composition to exhibit high adhesive strength and connection reliability even upon low-temperature connection.

The isocyanurate acrylate preferably has a differential scanning calorimetry (DSC) exothermic peak at 85 to 95° C. Particularly, a DSC exothermic peak at 92 to 95° C. is more preferred because such a range may indicate sufficient curing of the anisotropic conductive film by final pressing for a short time. An exothermic peak of the isocyanurate acrylate that appears below 85° C. may indicate that the anisotropic conductive film composition is pre-cured, and as a result, the anisotropic conductive film may not be sufficiently pressed against electrodes. An exothermic peak of the isocyanurate acrylate that appears above 95° C. may indicate that the anisotropic conductive film composition is not curable within a short time, reliability of connection resistance may not be obtained.

The isocyanurate acrylate may be included in an amount of about 5 to about 30% by weight, preferably about 10 to about 25% by weight, based on the total solid weight of the anisotropic conductive adhesive composition. The presence of the isocyanurate acrylate in an amount of less than about 5% by weight may lead to poor connection reliability. The presence of the isocyanurate acrylate in an amount exceeding about 30% by weight may lead to a reduction in adhesive strength.

Dicyclopentadiene (Meth)Acrylate

The dicyclopentadiene (meth)acrylate may serve to improve the modulus of the anisotropic conductive adhesive film, resulting in high reliability. As the dicyclopentadiene (meth)acrylate, there may be used, for example, tricyclodecanedimethanol diacrylate or tricyclodecanedimethanol dimethacrylate. The use of tricyclodecanedimethanol diacrylate is particularly preferred. The dicyclopentadiene (meth)acrylate may be included in an amount of about 5 to about 30% by weight, preferably about 7 to about 25% by weight, based on the total solid weight of the anisotropic conductive adhesive composition. The presence of the dicyclopentadiene (meth)acrylate in an amount of less than about 5% by weight may lead to poor connection reliability. The presence of the dicyclopentadiene (meth)acrylate in an amount exceeding about 30% by weight may lead to a reduction in adhesive strength.

At least one resin selected from the group of acrylate modified urethane resin and ester type urethane resin Acrylate Modified Urethane Resin The acrylate modified urethane resin may be included as a thermoplastic resin component in the anisotropic conductive composition in view of flowability and adhesive strength.

The acrylate modified urethane resin may be a binder system that improves the flowability of the anisotropic conductive composition due to its low glass transition temperature. In addition, high adhesive strength may be exhibited due to the presence of urethane groups in the molecular chain of the acrylate modified urethane resin. The use of the acrylate modified urethane resin may improve the curability of the anisotropic conductive film, enabling connection of the film at a low processing temperature.

Constituent components of the acrylate modified urethane resin may include, for example, a diisocyanate, a polyol (or a diol) and an acrylate.

As the diisocyanate, there may be used, for example, an aromatic, aliphatic, alicyclic diisocyanate or a combination thereof. Specifically, the diisocyanate may be selected from the group of tetramethylene-1,4-diisocyanate, hexamethylene-1,6-diisocyanate, cyclohexylene-1,4-diisocyanate, methylenebis(4-cyclohexyl diisocyanate), isophorone diisocyanate, 4,4'-methylenebis(cyclohexyl diisocyanate), and mixtures thereof.

The polyol may be one having two or more hydroxyl groups in the molecular chain, for example, a polyether polyol or a polycarbonate polyol. The polyether polyol preferably has a weight average molecular weight of about 400 to about 10,000 g/mol, particularly preferably about 400 to about 3,000 g/mol. Examples of suitable polycarbonate polyols include polycarbonate polyols derived from polyalkylene carbonate and silicone.

Examples of suitable diols include 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, and 1,4-cyclohexanedimethanol.

The acrylate may be a hydroxyacrylate or an amine acrylate.

The acrylate modified urethane resin including the above three components may be prepared by polyaddition polymerization of the diisocyanate and the polyol to synthesize a urethane in which the diisocyanate groups (NCO) and the hydroxyl groups (OH) are present in a molar ratio of 1.04-1.6:1 and the content of the polyol is not greater than about 70%, and reacting one of the terminal diisocyanate groups of the urethane with the hydroxyacrylate or the amine acrylate in a molar ratio of about 0.1 to about 2.1. Additionally, the remaining isocyanate groups may be reacted with an alcohol to prepare the final acrylate modified urethane resin. The polyaddition polymerization may be carried out by methods known in the art. The reaction may be carried out at a temperature of 90° C. and a pressure of 1 atm for 5 hours in the presence of a tin catalyst, as an example.

That is, phase mixing between the polyol as a soft segment and the diisocyanate as a hard segment may allow the acrylate modified urethane resin to have a single glass transition temperature not lower than 0° C. or at least one glass transition temperature not lower than 0° C. Therefore, the acrylate modified urethane resin may function as a binder that plays a role in forming a film at room temperature. The terminal acrylate groups of the acrylate modified urethane resin, together with the acrylates of the curable system, may undergo curing. The acrylate modified urethane resin may also function as a curable system to increase the adhesive strength and connection reliability of the composition.

The weight average molecular weight of the acrylate modified urethane resin may be from about 10,000 to about 100,000 g/mol, preferably from about 20,000 to about 40,000 g/mol. The acrylate modified urethane resin may have two glass transition temperatures (Tg), with the proviso that at least one of the glass transition temperatures is not lower than 0° C.

Ester Type Urethane Resin

The ester type urethane resin may be obtained by reaction of a polyester polyol and a diisocyanate.

The term "polyester polyol" refers to a polymer having ester groups and hydroxyl groups. The polyester polyol may be obtained by reaction of a dicarboxylic acid and a diol.

The dicarboxylic acid may include, for example, phthalic acid, terephthalic acid, isophthalic acid, adipic acid, sebacic acid, succinic acid, glutaric acid, suberic acid, azelaic acid, sebasic acid, dodecanedicarboxylic acid, hexahydrophthalic acid, ortho-phthalic acid, tetrachlorophthalic acid, 1,5-naphthalenedicarboxylic acid, fumaric acid, maleic acid, itaconic acid, citraconic acid, methaconic acid or tetrahydrophthalic acid. An aromatic dicarboxylic acid or an aliphatic dicarboxylic acid is preferred.

The diol may include, for example, ethylene glycol, propylene glycol, hexanediol, neopentyl glycol, diethylene glycol, triethylene glycol, 1,3-propanediol, 1,3-butanediol, 1,4-butanediol, 1,5-pentanediol, 1,6-hexanediol, dipropylene glycol, dibutylene glycol, 2-methyl-1,3-pentanediol, 2,2,4-trimethyl-1,3-pentanediol or 1,4-cyclohexanedimethanol. A glycol is preferred.

Examples of suitable diisocyanates include aromatic diisocyanates, aliphatic diisocyanates, alicyclic diisocyanates, and combinations thereof. For example, the diisocyanate may be selected from the group of isophorone diisocyanate (IPDI), tetramethylene-1,4-diisocyanate, hexamethylene-1,6-diisocyanate, diphenylmethane diisocyanate, cyclohexylene-1,4-diisocyanate, methylenebis(4-cyclohexyl isocyanate), xylene diisocyanate, hydrogenated diphenylmethane diisocyanate, naphthalene diisocyanate, 2,4-toluene diisocyanate, 2,6-toluene diisocyanate, and mixtures thereof. An aromatic diisocyanate is preferred.

The weight average molecular weight of the ester type urethane resin is preferably from about 10,000 to about 100,000, more preferably from about 25,000 to about 70,000.

Film-Forming Resin

The film-forming resin may be a polymer resin acting as a matrix of the anisotropic conductive adhesive film and may be a thermoplastic resin, a thermosetting resin or a combination thereof. The polymer resin may be selected from, for example, the group of olefin resins, including polyethylene and polypropylene, butadiene resins, acrylonitrile-butadiene copolymers, carboxyl-terminated acrylonitrile-butadiene copolymers, polyimide resins, polyamide resins, polyester resins, polyvinyl butyral resins, styrene-butylene-styrene (SBS) resins, styrene-ethylene-butylene-styrene (SEBS) resins, acrylonitrile-butadiene rubbers (NBRs), styrene acrylonitrile resins, urethane resins, (meth)acrylic resins and phenoxy resins.

Of these, a polymer resin having a molecular weight of about 10,000 to about 1,000,000 is preferred in terms of film-forming properties.

The film-forming resin may function to balance the excessive flowability of the ethylene-vinyl acetate copolymer and the acrylate modified urethane resin or the ester type urethane resin to maintain the shape of the film.

The film-forming resin may be included in an amount of about 5 to about 40% by weight, based on the total solid weight of the anisotropic conductive adhesive composition.

The anisotropic conductive adhesive composition may further include components commonly used in the art, for example, a material having a (meth)acrylate group, an organic peroxide and conductive particles.

Material Having (Meth)Acrylate Group

The compound having a (meth)acrylate group may be a radically polymerizable material and may be included as a component of the curable system that undergoes radical curing to guarantee high adhesive strength and connection reliability between connection layers.

The compound having a (meth)acrylate group may be, for example, a (meth)acrylate oligomer or a (meth)acrylate monomer. Examples of the (meth)acrylate oligomer include oligomers of epoxy (meth)acrylate, polyester (meth)acrylate, fluorinated (meth)acrylate, fluorene (meth)acrylate, silicon (meth)acrylate, phosphoric acid (meth)acrylate, maleimide modified (meth)acrylate and acrylate(methacrylate).

The epoxy (meth)acrylate oligomers may be selected from the group of epoxy (meth)acrylate oligomers whose intermediate molecular structures are skeletons of 2-bromohydroquinone, resorcinol, catechol, bisphenols such as bisphenol A, bisphenol F, bisphenol AD and bisphenol S, 4,4'-dihydroxybiphenyl and bis(4-hydroxyphenyl)ether; and epoxy (meth)acrylate oligomers including alkyl, aryl, methylol, allyl, alicyclic, halogen (tetrabromobisphenol A, etc.) and nitro groups.

Other (meth)acrylate oligomers may include (meth)acrylate oligomers containing at least two maleimide groups in the molecules, for example, 1-methyl-2,4-bismaleimide benzene, N,N'-m-phenylenebismaleimide, N,N'-p-phenylenebismaleimide, N,N'-m-tolylenebismaleimide, N,N'-4,4-biphenylenebismaleimide, N,N'-4,4-(3,3'-dimethylbiphenylene)bismaleimide, N,N'-4,4-(3,3'-dimethyldiphenylmethane) bismaleimide, N,N'-4,4-(3,3'-diethyldiphenylmethane)bismaleimide, N,N'-4,4-diphenylmethanebismaleimide, N,N'-4,4-diphenylpropanebismaleimide, N,N'-4,4-diphenyl ether bismaleimide, N,N'-3,3'-diphenylsulfonebismaleimide, 2,2-bis(4-(4-maleimidephenoxy)phenyl)propane, 2,2-bis(3-s-butyl-4-8(4-maleimidephenoxy)phenyl)propane, 1,1-bis(4-(4-maleimidephenoxy)phenyl)decane, 4,4'-cyclohexylidenebis (1-(4-maleimidephenoxy)-2-cyclohexylbenzene, and 2,2-bis(4-(4 maleimidephenoxy)phenyl)hexafluoropropane.

The (meth)acrylate monomer may be, for example, 1,6-hexanediol mono(meth)acrylate, 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol (meth)acrylate, 2-hydroxyethyl (meth) acryloyl phosphate, 4-hydroxycyclohexyl (meth)acrylate, neopentyl glycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerin di(meth)acrylate, t-hydrofurfuryl (meth)acrylate, isodecyl (meth)acrylate, 2-(2-ethoxyethoxy)ethyl (meth)acrylate, stearyl (meth)acrylate, lauryl (meth)acrylate, 2-phenoxyethyl (meth)acrylate, isobornyl (meth)acrylate, tridecyl (meth)acrylate, ethoxylated nonylphenol (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, 1,3-butylene glycol di(meth)acrylate, tripropylene glycol di(meth)acrylate, ethoxylated bisphenol-A di(meth)acrylate, cyclohexanedimethanol di(meth)acrylate, phenoxy-t-glycol (meth)acrylate, 2-methacryloyloxymethyl phosphate, dimethyloltricyclodecane di(meth)acrylate, trimethylolpropane benzoate acrylate, fluorene (meth)acrylate, and acid phosphoxyethyl (meth)acrylate.

The compound having a (meth)acrylate group may be included in an amount of about 1 to about 10% by weight, preferably about 1 to about 5% by weight, based on the solid content of the anisotropic conductive adhesive composition. Within this range, a reduction in adhesive strength may not occur despite a rise in pressing temperature. No uncured portion may remain despite a reduction in pressing temperature, implying high connection reliability.

Organic Peroxide

The organic peroxide may function as a curing agent that generates free radicals by heat or light. Examples of such organic peroxides include, for example, lauroyl peroxide, t-butyl peroxylaurate, 1,1,3,3-t-methylbutylperoxy-2-ethyl hexanoate, 2,5-dimethyl-2,5-di(2-ethylhexanoylperoxy) hexane, 1-cyclohexyl-1-methylethyl peroxy-2-ethyl hexanoate, 2,5-dimethyl-2,5-di(m-toluoylperoxy)hexane, t-butyl peroxyisopropyl monocarbonate, t-butyl peroxy-2-ethylhexyl monocarbonate, t-hexyl peroxybenzoate, t-butyl peroxyacetate, dicumyl peroxide, 2,5,-dimethyl-2,5-di(t-butylperoxy)hexane, t-butylcumyl peroxide, t-hexyl peroxyneodecanoate, t-hexyl peroxy-2-ethyl hexanoate, t-butyl peroxy-2-2-ethyl hexanoate, t-butyl peroxyisobutyrate, 1,1-bis(t-butylperoxy)cyclohexane, t-hexyl peroxyisopropyl monocarbonate, t-butyl peroxy-3,5,5-trimethyl hexanoate, t-butyl peroxypivalate, cumyl peroxyneodecanoate, diisopropyl benzenehydroperoxide, cumen hydroperoxide, isobutyl peroxide, 2,4-dichlorobenzoyl peroxide, 3,5,5-trimethylhexanoyl peroxide, octanoyl peroxide, stearoyl peroxide, succinic peroxide, benzoyl peroxide, 3,5,5-trimethyl hexanoyl peroxide, benzoyl peroxytoluene, 1,1,3,3-tetramethyl butyl peroxyneodecanoate, 1-cyclohexyl-1-methylethyl peroxyneodecanoate, di-n-propyl peroxydicarbonate, diisopropyl peroxycarbonate, bis(4-t-butylcyclohexyl)peroxydicarbonate, di-2-ethoxymethoxy peroxydicarbonate, di(2-ethylhexylperoxy)dicarbonate, dimethoxybutyl peroxydicarbonate, di(3-methyl-3-methoxybutylperoxy)dicarbonate, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-(t-butylperoxy)cyclododecane, 2,2-bis(t-butylperoxy)decane, t-butyltrimethylsilyl peroxide, bis(t-butyl)dimethylsilyl peroxide, t-butyltriallylsilyl peroxide, bis(t-butyl)diallylsilyl peroxide and tris(t-butyl)arylsilyl peroxide.

The organic peroxide preferably has a half-life of about 5 to about 15 hours at 40° C. to 100° C. If the half-life of the organic peroxide is excessively short, the high degradation rate may cause a problem during room-temperature storage. Meanwhile, if the half-life of the organic peroxide is excessively long, the polymerization rate is too retarded, thus being unsuitable for rapid curing.

The organic peroxide may be included in an amount of 1 to about 10% by weight, based on the solid content of the anisotropic conductive adhesive composition. Within this range, the curing reaction rate may be maintained without deteriorating the final pressing properties and the anisotropic conductive adhesive film may be protected from breakage after curing by heating. A failure of the anisotropic conductive adhesive film to remain un-removed even when reworked may be avoided when the anisotropic conductive adhesive composition is used.

Conductive Particles

The conductive particles may be for example: metal particles, including Au, Ag, Ni, Cu and solder particles; carbon particles; particles of resins including, for example, polyethylene, polypropylene, polyester, polystyrene, polyvinyl alcohol and modified resins thereof plated and coated with metals including, for example, Au, Ag and Ni; and insulated conductive particles obtained by further coating insulating particles on the metal-coated polymer resin particles. The size of the conductive particles may be determined depending on the pitch of circuits to be applied and may be in the range of about 2 to about 50 μm according to the intended application.

The conductive particles may be included in an amount of about 1 to about 10% by weight, preferably about 1 to about 5% by weight, based on the solid content of the anisotropic conductive adhesive composition. Within this range, the conductive particles can retain its inherent ability to connect circuits while maintaining insulating properties.

The composition for the anisotropic conductive adhesive film may further be blended with one or more additives selected from the group of pigments for coloring, dyes, polymerization inhibitors and silane coupling agents in order to obtain desired characteristics of the cured product, taking into consideration the shape and workability of final products. Any suitable amounts of the additives may be used.

Figure 2:
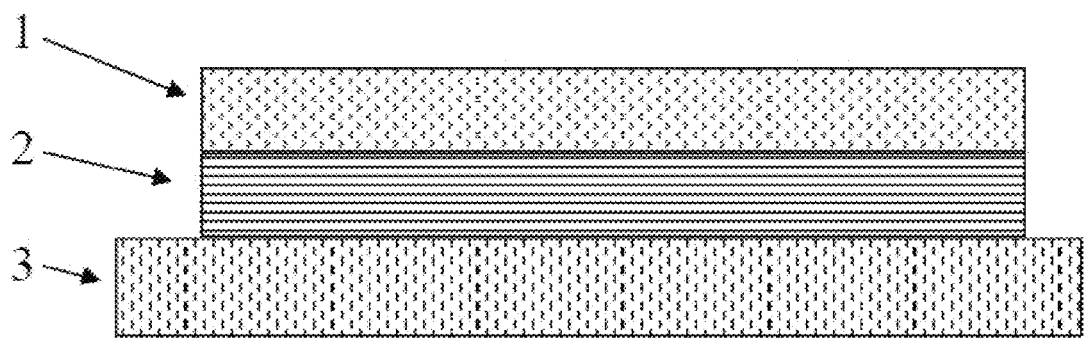
FIG. 2 illustrates an electronic device having elements bonded by an anisotropic conductive film according to an embodiment.

FIG. 2 illustrates an electronic device having elements bonded by an anisotropic conductive film according to an embodiment. The electronic device may include a wiring substrate 3, an anisotropic conductive film 2 attached to an element mounting surface of the wiring substrate 3, and an electrical element (e.g., a semiconductor chip) 1 bonded to the wiring substrate 3 by the anisotropic conductive film 2.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further it is to be understood that the embodiments are not limited to the particular details described in the Examples and Comparative Examples.

EXAMPLES

Example 1

Production of Anisotropic Conductive Adhesive Film (1) Preparation of Anisotropic Conductive Adhesive Composition a. Preparation of Acrylate Modified Urethane Resin First, 60 wt % of polytetramethylene glycol as a polyol, 13.53 wt % of 1,4-butanediol and 26.14 wt % of toluene diisocyanate were reacted to synthesize an isocyanate-terminated prepolymer. The isocyanate-terminated prepolymer was further reacted with 0.3 wt % of hydroxyethyl methacrylate in a molar ratio of 1:0.5 to prepare a polyurethane acrylate resin. Polyaddition polymerization of the polyurethane acrylate resin in the presence of 0.03 wt % of dibutyltin dilaurate as a catalyst at a temperature of 90° C. and a pressure of 1 atm for 5 hours afforded an acrylate modified urethane resin having a weight average molecular weight of 25,000.

b. Preparation of Anisotropic Conductive Adhesive Composition 10 wt % of the acrylate modified urethane resin, 15 wt % of an ethylene-vinyl acetate copolymer (Levamelt 700, LANXESS), a solution (solid content=50%) of 14 wt % of a carboxyl group-modified acrylonitrile butadiene rubber (weight average molecular weight=240,000, Nipol NBR, Zeon) in methyl ethyl ketone (MEK), a solution of 20 wt % of a styrene acrylonitrile resin having a weight average molecular weight of 100,000 in MEK, 15 wt % of an isocyanuric acid ethylene oxide-modified triacrylate having a DSC exothermic peak at 92-95° C., 15 wt % of tricyclodecane dimethanol diacrylate (Shin Nakamura), 2.5 wt % of acid phosphoxyethyl methacrylate, 2.5 wt % of phosphate acrylate having a weight average molecular weight of 12,000, a solution (solid content=10%) of 1.0 wt % of lauroyl peroxide as an organic peroxide in toluene, a solution (solid content=10%) of 2.0 wt % of benzoyl peroxide as an organic peroxide in toluene, and 3 wt % of nickel-coated polymer conductive balls having an average particle diameter of 4 to 6 μm as conductive particles were mixed to prepare an anisotropic conductive adhesive composition.

(2) Production of Anisotropic Conductive Adhesive Film

The anisotropic conductive adhesive composition was dissolved in toluene as an organic solvent. The solution was stirred at a rate that does not cause pulverization of the conductive particles for a certain period of time, applied to a thickness of 10-50 μm onto a release film, and dried for a time sufficient to vaporize the organic solvent to produce an anisotropic conductive adhesive film.

No special apparatus or equipment was used to produce the anisotropic conductive film.

Example 2

An anisotropic conductive adhesive film was produced in the same manner as in Example 1, except that the contents of the individual components were changed as shown in Table 1.

Comparative Examples 1-4

Anisotropic conductive adhesive films were produced in the same manner as in Example 1, except that the individual components and the contents thereof were changed as shown in Table 1.

Experimental Example 1

Connection Resistance, Bubbling Area and Flowability Measurements

The anisotropic conductive adhesive films produced in Examples 1-2 and Comparative Examples 1-4 were measured for connection resistance, connection resistance after reliability evaluation, bubbling area and flowability by the following methods.

Methods for Measuring Physical Properties (1) Connection Resistance

To evaluate the circuit connection performance of each of the anisotropic conductive adhesive films, the anisotropic conductive adhesive film was pressed using a flexible printed circuit board (FPCB) (electrode height=25 μm, manufactured by BH Flex) and a glass TEG (Test Element Group) (manufactured by Cheil Industries Inc.), which was not patterned, but instead was deposited with indium tin oxide (ITO) over the entire surface thereof for electrical connection.

The anisotropic conductive adhesive film was preliminarily pressed against circuit forming portions of the glass panel at 80° C. and 1 MPa for 1 second. A release film was removed and the FPCB terminals were located opposite the circuit forming portions, followed by final pressing at 180° C. and 3 MPa for 5 seconds. After storage in a chamber under high temperature (85° C.) and high humidity (85%) conditions for 250 hours, the connection resistance of the circuit-connected structure was measured using a 2-point probe method for reliability evaluation. The resistance between two points of the anisotropic conductive adhesive film was measured using two probes connected to an ohmmeter. The resistance was calculated from a voltage measured when the ohmmeter applied a current of 1 mA.

TABLE 1

| | Example 1 | Example 2 | Comparative Example 1 | Comparative Example 2 | Comparative Example 3 | Comparative Example 4 |
|---|---|---|---|---|---|---|
| (A) Ethylene-vinyl acetate copolymer (wt %) | 15 | 24 | 25 | | 15 | 15 |
| (B) Acrylate modified urethane resin (wt %) | 10 | 20 | | 25 | 10 | 10 |
| (C) Carboxyl group-modified acrylonitrile butadiene rubber (wt %) | 14 | 10 | 14 | 14 | 14 | 14 |
| (D) Styrene acrylonitrile resin (wt %) | 20 | 5 | 20 | 20 | 20 | 20 |
| (E) Isocyanuric acid ethylene oxide-modified triacrylate (wt %) | 15 | 20 | 15 | 15 | 30 | |
| (F) Dicyclopentadiene (meth)acrylate (wt %) | 15 | 10 | 15 | 15 | | 30 |
| (G) Other materials having (meth)acrylate group (wt %) | 5 | 5 | 5 | 5 | 5 | 5 |
| (H) Organic peroxides (wt %) | 3 | 3 | 3 | 3 | 3 | 3 |
| (I) Conductive particles (wt %) | 3 | 3 | 3 | 3 | 3 | 3 |
| Total (wt %, based on solid content) | 100 | 100 | 100 | 100 | 100 | 100 |

(A) Ethylene-vinyl acetate copolymer: Levamelt 700, LANXESS
(B) Acrylate modified urethane resin
The acrylate modified urethane resin was synthesized by polyaddition polymerization under the following conditions: solvent = 50 vol % methyl ethyl ketone, polyol content = 60%, hydroxyl methacrylate/isocyanate molar ratio = 0.5, temperature = 90° C., pressure = 1 atm, reaction time = 5 hours, catalyst = dibutyltin dilaurate. The acrylate modified urethane resin had a weight average molecular weight of 25,000
(C) Carboxyl group-modified acrylonitrile butadiene rubber: weight average molecular weight = 240,000, Nipol NBR, Zeon
(D) Styrene acrylonitrile resin: Tg = 120° C., weight average molecular weight = 100,000, Cheil Industries Inc.
(E) Isocyanuric acid ethylene oxide-modified triacrylate: DSC exothermic peak at 92-95° C.
(F) Dicyclopentadiene (meth)acrylate: tricyclodecane dimethanol diacrylate, Shin Nakamura
(G) Other materials having (meth)acrylate group
Acid phosphoxyethyl methacrylate
Phosphate acrylate: weight average molecular weight = 12,000
(H) Organic peroxides: Lauroyl peroxide and benzoyl peroxide
(I) Conductive particles: Nickel-coated polymer conductive balls, average particle diameter = 4-6 μm.

(2) Bubbling Area

The area where bubbles were generated in each of the anisotropic conductive adhesive films produced in Examples 1-2 and Comparative Examples 1-4 was measured by the following procedure. First, the anisotropic conductive adhesive film was preliminarily pressed and finally pressed in the same manner as in the above connection resistance measurement.

Five specimens connected to electrodes under the preliminary pressing and final pressing conditions were prepared. Images of 10 sites of each specimen were taken using an optical microscope. The bubbling areas of space portions between the electrodes were measured using an image analyzer and were averaged.

(3) Flowability (%)

The flowability (%) of each of the anisotropic conductive adhesive films produced in Examples 1-2 and Comparative Examples 1-4 was calculated as follows. First, the width of the anisotropic conductive film before preliminary pressing and final pressing $A_0$ was measured. The anisotropic conductive film was preliminarily pressed against circuit forming portions of a glass panel at 80° C. and 1 MPa for 1 second, and then a release film was removed. FPCB terminals (pitch=140 μm, electrode height=25 μm, electrode length=1,000 μm (the electrode length refers to the vertical length of the electrode, see FIG. 1)) were located opposite the circuit forming portions. After the anisotropic conductive film was finally pressed at 180° C. and 3 MPa for 5 seconds, the width of the central portion of the anisotropic conductive film $A_t$ was measured. The widths $A_0$ and $A_t$ were substituted into Equation 1:

Flowability (%)=$A_t/A_0$×100     (Equation 1)

The measured physical properties of the anisotropic conductive adhesive films of Examples 1-2 and Comparative Examples 1-4 are shown in Table 2.

TABLE 2

|  |  | Example 1 | Example 2 | Comparative Example 1 | Comparative Example 2 | Comparative Example 3 | Comparative Example 4 |
|---|---|---|---|---|---|---|---|
| Connection resistance | Initial | 1.79 | 1.74 | 1.69 | 1.73 | 1.75 | 1.75 |
|  | Reliability 250 hr | 2.14 | 2.10 | 3.26 | 3.87 | 4.39 | 2.77 |
| Bubbling area (%) |  | 0 | 0 | 7 | 8 | 4 | 5 |
| Flowability (%) |  | 61 | 62 | 48 | 47 | 61 | 60 |

As can be determined from the results in Table 2, the anisotropic conductive adhesive compositions and films of Examples 1 and 2 showed high flowability without bubble generation bubbles and low connection resistance increments even after reliability evaluation.

In addition, the anisotropic conductive adhesive compositions of Examples 1 and 2 could be rapidly cured at a low temperature of 160-200° C. within a short connection time of 5 seconds or less. This rapid curability may shorten the time required for pressing, contributing to an enhancement in production efficiency.

By way of summation and review, with the recent trend toward large size and slimness in display industries, pitches between electrodes and between circuits have gradually become finer. Anisotropic conductive adhesive films play an important role as interconnection mechanisms for the connection of fine circuit terminals (e.g., in electronic devices such as semiconductor devices, displays, etc.). As a consequence, anisotropic conductive adhesive films are receiving much attention as materials for electrical connection.

For the use of anisotropic conductive adhesive films as connection materials, high connection reliability is desirable. The initial properties (for example, connection resistance and adhesive strength) of anisotropic conductive adhesive films may vary depending on what conditions the films are exposed to. For example, the connection resistance may be increased or the adhesive strength may be decreased, resulting in low connection reliability of the films. Further, bubbles may be generated in terminals during use of the films, which may also cause low connection reliability of the films.

Epoxy resin-based adhesives are widely used in various application fields, including electric, electronic and construction fields, due to their high adhesive strength and good resistance to water and heat. For use in these fields, epoxy resin-based adhesives may undergo heating at a temperature of about 140 to about 180° C. for a connection time of about 20 seconds or at a temperature of about 180 to about 210° C. for a connection time of about 10 seconds. In recent years, higher circuit density in the field of electronic devices has brought about reductions in the width of electrodes and the intervals between electrodes. Under existing conditions for the connection of circuit connecting materials using epoxy-based resins, however, interconnection lines may fall off, peel off or dislocate.

Thus, an anisotropic conductive adhesive composition that is highly flowable and has excellent bubble-suppressing properties and resistance retention properties even at 160 to 200° C. for a connection time of 5 seconds is desirable.

Embodiments relate to a composition for an anisotropic conductive film and an anisotropic conductive film formed therefrom, with high flowability and excellent bubble-suppressing properties and resistance retention properties. More specifically, embodiments may relate to an electronic device using a composition for an anisotropic conductive film or an anisotropic conductive film formed therefrom, which includes an ethylene-vinyl acetate copolymer and at least one resin selected from the group of an acrylate modified urethane resin and an ester type urethane resin to exhibit high flowability upon heating/pressing, and which includes an isocyanurate acrylate beginning to cure at a low reaction temperature and having a rapid curability rate, and a dicyclopentadiene (meth)acrylate acting to improve the modulus of a cured product to attain high reliability, thereby achieving excellent bubble-suppressing properties and excellent resistance retention properties under extreme conditions of high temperature and high humidity while maintaining rapid curability at low temperature. The anisotropic conductive adhesive film may be rapidly cured even at a low temperature of 160 to 200° C. for a connection time of 5 seconds or less. This rapid curability shortens the time required for pressing, contributing to an enhancement in production efficiency. The anisotropic conductive film of the electronic device may achieve both bubble-suppressing properties and resistance retention properties at 160 to 200° C. for a connection time of 5 seconds, which may not be achieved by conventional films of epoxy-based compositions.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. An electronic device, comprising:
an anisotropic conductive adhesive film as a connection material, wherein:
the anisotropic conductive adhesive film is formed from a composition that includes:
about 10 to about 40% by weight of an ethylene-vinyl acetate copolymer,
about 5 to about 40% by weight of a total amount of at least one resin selected from the group of an acrylate modified urethane resin and an ester type urethane resin,
about 5 to about 30% by weight of an isocyanurate acrylate,
about 5 to about 30% by weight of a dicyclopentadiene (meth)acrylate, and
about 5 to about 40% by weight of a film-forming resin, based on the total solid weight of the anisotropic conductive adhesive composition, and
the anisotropic conductive adhesive film has a flowability of 50% or more after preliminary pressing at 80° C. and 1 MPa for 1 second and final pressing at 180° C. and 3 MPa for 5 seconds, and a connection resistance increment greater than 0% but not greater than 25%, as calculated by Expression 1:

Connection resistance increment (%)=|(A−B)/A|×100 (Expression 1)

where A is a connection resistance measured after preliminary pressing at 80° C. and 1 MPa for 1 second and final pressing at 180° C. and 3 MPa for 5 seconds, and B is a connection resistance measured after reliability evaluation at a temperature of 85° C. and a humidity of 85% for 250 hours following preliminary pressing and final pressing.

2. The electronic device as claimed in claim 1, wherein a solid weight ratio of the ethylene-vinyl acetate copolymer to a total amount of the at least one resin selected from the group of the acrylate modified urethane resin and the ester type urethane resin is from about 1:3 to about 3:1.

3. The electronic device as claimed in claim 1, wherein:
the isocyanurate acrylate includes an isocyanuric acid ethylene oxide-modified triacrylate, and
the dicyclopentadiene (meth)acrylate includes a tricyclodecanedimethanol diacrylate.

4. The electronic device as claimed in claim 1, wherein the anisotropic conductive adhesive composition further includes about 1 to about 10% by weight of an organic peroxide and about 1 to about 10% by weight of conductive particles.

5. The electronic device as claimed in claim 1, wherein:
the at least one resin selected from the group of an acrylate modified urethane resin and an ester type urethane resin includes the acrylate modified urethane resin, and
the acrylate modified urethane resin is formed from a diisocyanate, a polyol, and an acrylate.

6. An electronic device, comprising:
an anisotropic conductive adhesive film as a connection material, wherein the anisotropic conductive adhesive film is formed from a composition that includes:
about 10 to about 40% by weight of an ethylene-vinyl acetate copolymer,
about 5 to about 40% by weight of a total amount of at least one resin selected from the group of an acrylate modified urethane resin and an ester type urethane resin,
about 5 to about 30% by weight of an isocyanurate acrylate, and
about 5 to about 30% by weight of a dicyclopentadiene (meth)acrylate, and
about 5 to about 40% by weight of a film-forming resin, based on the total solid weight of the anisotropic conductive adhesive composition.

7. The electronic device as claimed in claim 6, wherein the anisotropic conductive adhesive composition further includes about 1 to about 10% by weight of an organic peroxide and about 1 to about 10% by weight of conductive particles.

8. The electronic device as claimed in claim 6, wherein a solid weight ratio of the ethylene-vinyl acetate copolymer to a total amount of the at least one resin selected from the group of the acrylate modified urethane resin and the ester type urethane resin is from about 1:3 to about 3:1.

9. The electronic device as claimed in claim 6, wherein:
the at least one resin selected from the group of an acrylate modified urethane resin and an ester type urethane resin includes the acrylate modified urethane resin, and
the acrylate modified urethane resin is formed from a diisocyanate, a polyol, and an acrylate.

10. The electronic device as claimed in claim 9, wherein the diisocyanate that forms the acrylate modified urethane resin is selected from the group of tetramethylene-1,4-diisocyanate, hexamethylene-1,6-diisocyanate, cyclohexylene-1,4-diisocyanate, methylenebis(4-cyclohexyl diisocyanate), isophorone diisocyanate, 4,4'-methylenebis(cyclohexyl diisocyanate), and mixtures thereof.

11. The electronic device as claimed in claim 9, wherein the polyol that forms the acrylate modified urethane resin is a polyester polyol, a polycarbonate polyol, or a diol, the diol being selected from the group of 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, and 1,4-cyclohexanedimethanol.

12. The electronic device as claimed in claim 9, wherein the acrylate that forms the acrylate modified urethane resin is a hydroxyacrylate or an amine acrylate.

13. The electronic device as claimed in claim 6, wherein:
the at least one resin selected from the group of an acrylate modified urethane resin and an ester type urethane resin includes the acrylate modified urethane resin, and
the acrylate modified urethane resin is a reaction product of a polyester polyol and a diisocyanate.

14. The electronic device as claimed in claim 13, wherein:
the polyester polyol that forms the acrylate modified urethane resin is a reaction product of a dicarboxylic acid and a diol,
the dicarboxylic acid is at least one of phthalic acid, terephthalic acid, isophthalic acid, adipic acid, sebacic acid, succinic acid, glutaric acid, suberic acid, azelaic acid, sebasic acid, dodecanedicarboxylic acid, hexahydrophthalic acid, ortho-phthalic acid, tetrachlorophthalic acid, 1,5-naphthalenedicarboxylic acid, fumaric acid, maleic acid, itaconic acid, citraconic acid, methaconic acid or tetrahydrophthalic acid, and the diol is at least one of ethylene glycol, propylene glycol, hexanediol, neopentyl glycol, diethylene glycol, triethylene glycol, 1,3-propanediol, 1,3-butanediol, 1,4-butanediol, 1,5-pentanediol, 1,6-hexanediol, dipropylene glycol, dibutylene glycol, 2-methyl-1,3-pentanediol, 2,2,4-trimethyl-1,3-pentanediol or 1,4-cyclohexanedimethanol.

15. The electronic device as claimed in claim 13, wherein the diisocyanate that forms the acrylate modified urethane resin is selected from the group of isophorone diisocyanate (IPDI), tetramethylene-1,4-diisocyanate, hexamethylene-1,6-diisocyanate, diphenylmethane diisocyanate, cyclohexylene-1,4-diisocyanate, methylenebis(4-cyclohexyl isocyanate), xylene diisocyanate, hydrogenated diphenylmethane diisocyanate, naphthalene diisocyanate, 2,4-toluene diisocyanate, 2,6-toluene diisocyanate, and mixtures thereof.

16. The electronic device as claimed in claim 6, wherein the film-forming resin is selected from the group of olefin resins, including polyethylene and polypropylene, butadiene resins, acrylonitrile-butadiene copolymers, carboxyl-terminated acrylonitrile-butadiene copolymers, polyimide resins, polyamide resins, polyester resins, polyvinyl butyral resins, styrene-butylene-styrene (SBS) resins, styrene-ethylene-butylene-styrene (SEBS) resins, acrylonitrile-butadiene rubbers (NBRs), styrene acrylonitrile resins, urethane resins, (meth)acrylic resins and phenoxy resins.

\* \* \* \* \*